US006973189B1

(12) United States Patent
Bodin

(10) Patent No.: US 6,973,189 B1
(45) Date of Patent: Dec. 6, 2005

(54) METHOD OF ENCRYPTING INFORMATION IN A TDMA MOBILE RADIO SYSTEM USING A MODIFIED PSEUDO-RANDOM SEQUENCE

(75) Inventor: Roland Bodin, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/410,044

(22) Filed: Oct. 1, 1999

Related U.S. Application Data

(62) Division of application No. 08/765,269, filed on Feb. 18, 1997, now Pat. No. 5,987,139.

(30) Foreign Application Priority Data

Sep. 27, 1995 (SE) ..................................... 9503343

(51) Int. Cl.[7] ................................................. H04L 9/00

(52) U.S. Cl. ............................ 380/46; 380/270; 380/37

(58) Field of Search ......................... 380/46, 238, 270, 380/37, 47, 268, 255; 708/250, 255

(56) References Cited

U.S. PATENT DOCUMENTS

| 4,502,137 A | * | 2/1985 | Tan .............................. 370/85 |
| 4,791,669 A | * | 12/1988 | Kange |
| 5,148,485 A | | 9/1992 | Dent |
| 5,412,730 A | * | 5/1995 | Jones .......................... 380/46 |
| 5,442,705 A | | 8/1995 | Miyano |
| 5,590,133 A | * | 12/1996 | Billstrom et al. ........... 370/349 |

FOREIGN PATENT DOCUMENTS

WO    WO88/00416    1/1988

OTHER PUBLICATIONS

ETSI, European digital cellular telecommunications system (Phase 2); Security related network functions (GSM 03.20), May 1994, pp. 2-53.
ETSI, European digital cellular telecommunications system (Phase 2); Multiplexing and multiple access on the radio path (GSM 05.02), May 1994, pp. 2-37.
ETSI, "High Speed Circuit Switched Data (HSCSD)", STC SMG3, T doc SMG3 WPA 95A 308, Aug. 29, 1995 (Nokia Telecommunications), point 5.

* cited by examiner

Primary Examiner—Hosuk Song

(57) ABSTRACT

The method involves modifying an encryption key (Kc) in accordance with a given algorithm and in dependence on the ordinal number of a time slot to obtain a modified encryption key. A modified pseudo-random sequence is formed from the resultant modified encryption key. The modification is carried out in accordance with the aid of an encryption algorithm. A logical operation is performed on the modified pseudo-random sequence and for each block of the non-encrypted information. Preferably the operation is performed on the information block that belongs to the time slot whose ordinal number has been used to form the modified encryption key. As an additional option, the frame number can also be modified in accordance with a given algorithm and in dependence on the ordinal number of the relevant time slot. The method provides reliable encryption in TDMA mobile radio systems in which two or more time slots are used for one and the same transmission without requiring any substantial changes to signaling protocol and/or system equipment.

1 Claim, 4 Drawing Sheets

$AN = Alg\,(A3, A8)$    $AN = Alg\,(A3, A8)$

METHOD OF ENCRYPTING INFORMATION IN A TDMA MOBILE RADIO SYSTEM USING A MODIFIED PSEUDO-RANDOM SEQUENCE

This application is a Divisional of Ser. No. 08/765,269 filed Feb. 18, 1997 now U.S. Pat. No. 5,987,139.

FIELD OF INVENTION

The present invention relates to a method of encrypting information between a stationary network and a mobile station in a mobile radio system of the time division multiple access type (TDMA system).

More specifically, the invention relates to methods of encrypting the transmitted information in a more secure fashion in conjunction with an authorization check on the mobile by the network and when a multiple of time slots are used for the same user (mobile station).

DESCRIPTION OF THE BACKGROUND ART

The GSM-network, common in Europe, is a mobile radio network that uses time division multiple access (TDMA). As with other mobile radio networks, the GSM network employs authorization checks and encryption of transmitted messages. With regard to the GSM network, this is specified in "GSM specification 03.20", May 1994, issued by ETSI (European Telecommunication Standard Institute) and hereinafter referred to as ETSI/GSM 03.20. The various algorithms used in authorization checks and encryption are described in this reference.

As described in ETSI/GSM 03.20, an algorithm A3 is used to effect actual authorization checks between network and subscriber apparatus. As further described, an algorithm A5 is used for encryption of the payload information to be transmitted, and an algorithm A8 is used to forms from the subscriber authorization key Ki, an encryption key Kc.

As a rule, only one time slot per frame for a given connection is used in TDMA-type time division mobile radio systems; see ETSI/GSM 05.02, The use of two or more time slots, not necessarily consecutive time slots, in a transmission frame has been proposed, see ETSI/STC SMG3, T doc SMG3 WPA 95A dated 29 Aug. 1995 (Nokia Telecommunications), see particularly point 5 "HSCSD Architecture". This provides the advantage of enabling larger quantities of information to be transmitted per unit of time (applicable particularly to data transmissions), but has the drawback of increasing bandwidth.

SUMMARY OF THE INVENTION

The inclusion in a GSM system of two or more time slots instead of one time slot for one and the same radio transmission in accordance with the aforegoing creates certain problems when encryption and authorization checks are to be employed.

The most obvious procedure would be to process each of the time slots separately and to process the information in accordance with earlier known principles. However, such procedures would require drastic modification to the existing signalling protocols and to equipment on both the network side and the mobile station side.

It would be desirable to avoid such modifications to existing standards and equipment to the greatest possible extent. The use of the same pseudo-random sequence for all time slots within one and the same frame and for a given frame number is proposed in the aforementioned ETSI document, ETSI/T doc SMG3, "First HSCSD stage 2 draft". The drawback with this method is that it is necessary to compromise between encryption safety and procedure simplicity. When two separate bursts belonging to one and the same user are transmitted in this manner while using the same encryption sequence (pseudo-random sequence), the influence of the encryption can be eliminated relatively simply, by carrying out simple EXOR operations.

The object of the present invention is therefore to provide methods for reliable encryption in a TDMA-type mobile radio system in which two or more time slots are used for one and the same transmission without needing to make substantial changes to the signalling protocol and/or system equipment.

BRIEF DESCRIPTION OF THE DRAWINGS

The aforesaid inventive methods will now be described in more detail with reference to the accompanying drawings.

DETAILED DESCRIPTION OF PREFERRED EMBODIMENTS

Figure 1:
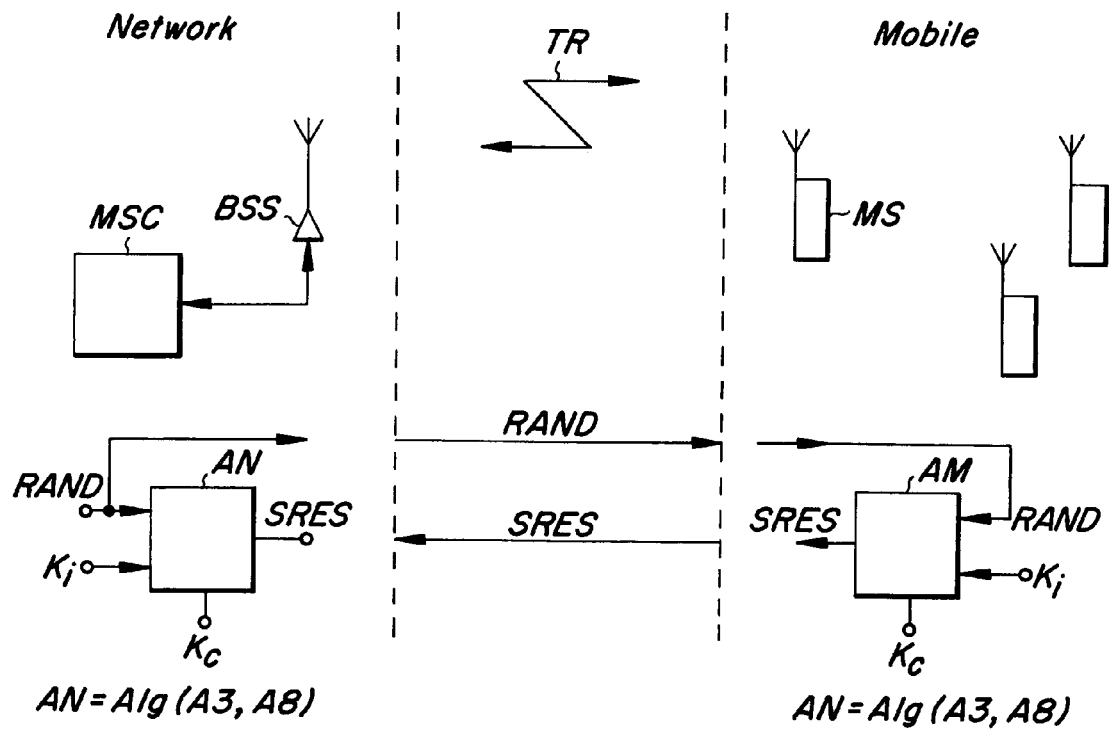
FIG. 1 illustrates, schematically) signalling between a network side and a mobile station side in a mobile radio system during the authorization check procedure.

FIG. 1 is a simplified schematic illustration of a mobile radio system, for instance a GSM-system. The system has a network side "NETWORK" and a mobile station side "Mobile".

The network side includes a base station system BSS which is connected to a mobile switching centre MSC, which is connected, in turn, to the public telephone network (not shown). The base station system BSS typically includes a base transceiver station BTS and a base station controller BSC (not shown). In reality, a plurality of base station systems are connected to the mobile switching centre MSC on the network side, while the mobile station side includes a plurality of mobile stations that can communicate simultaneously with the base station system BSS. The network side and the mobile station side transmit information via radio signals over an air interface which is symbolized in FIG. 1 with the reference TR.

Before the actual information is transmitted and received between the network and a given mobile station MS, the network is obliged to check the authorization of the mobile station MS. This authorization check is carried out in accordance with known principles, whereby the network, i.e. the base station system BSS, sends a random number (so-called "random challenge") RAND to the mobile station MS over a dedicated control channel DCCH.

The mobile station MS receives the random number RAND and forms a response SRES (signed response) from this random number and from the mobile station's own key Ki in accordance with a given algorithm A3, as described on page 50 of the aforesaid ETSI/GSM 03.20.

At the same time, the mobile station MS compiles an encryption key Kc from the key Ki in accordance with another algorithm A8. The response SRES is sent to the base station system BSS, while the encryption key Kc is used in the encryption carried out in the mobile station in accordance with the following. A comparison is made in the base station system BSS with corresponding values of SRES calculated by the mobile switching center (MSC) in accordance with the same conventional algorithms A3 and A8 found in the mobile station MS. When a coincidental result is obtained, the mobile station is considered to be authorized and communication can continue. The continued information transmission will thereafter be encrypted in accordance with a given algorithm A5, as described on pages 48–49 of ETSI/GSM 03.20.

Thus, the network includes an algorithm block AN which stores and carries out an authorization check in accordance with the algorithms A3 and A8 and encryption in accordance with the algorithm A5. The mobile station MS includes a corresponding algorithm block AM which stores and carries out an authorization check in accordance with the same algorithms A3 and A8 and encryption in accordance with the algorithm A5.

The encryption key Kc is generated by the mobile switching center (MSC) on the basis of the mobile station's encryption key Ki, which is known to the mobile telephone switching centre. Subsequent to making the authorization check, (algorithm A3), the mobile telephone switching centre MSC sends the key Kc to the base station system BSS and encryption of payload information can be commenced with the aid of the agreed encryption key Kc.

Figure 2:
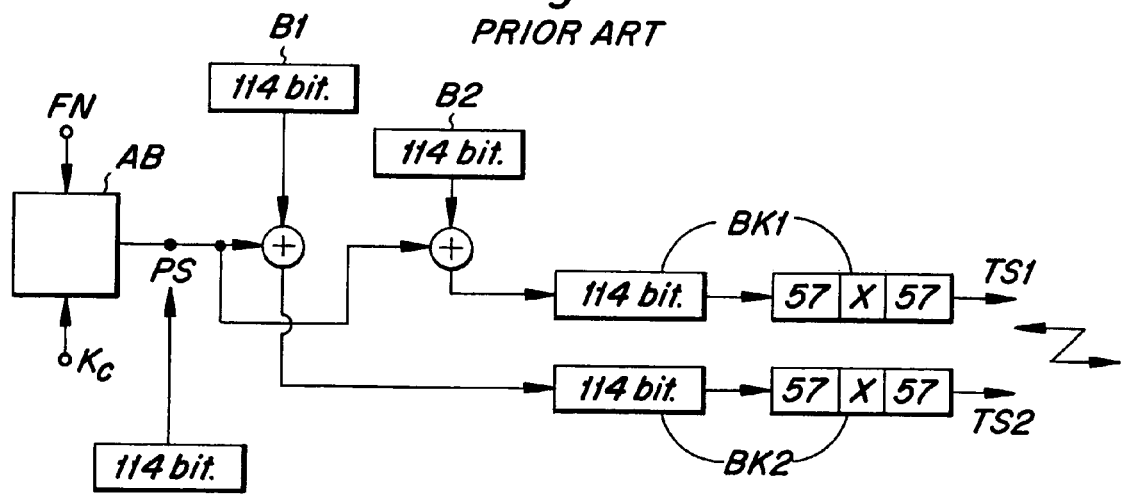
FIG. 2 is a block diagram illustrating known information encryption in the system illustrated in FIG. 1.

FIG. 2 illustrates schematically the manner in which the payload information is encrypted and formatted for transmission over two time slots TS1, TS2 in accordance with the aforesaid NOKIA proposal.

Normally, the payload information is divided from, e.g., a speech frame into one or more blocks each of 114 bits. One such block is encrypted in accordance with the algorithm A5 and sent during a burst in a given time slot, optionally interfoliated with another adjacent block. The next encrypted block then follows. As illustrated in FIG. 2, when two time slots in a given frame are available, an information block is now divided into two sub-blocks B1 and B2, each containing 114 bits, and each block is encrypted with the same pseudo-random sequence PS of 114 bits as normal, by carrying out two EXOR operations shown in FIG. 2.

The pseudo-random sequence PS is obtained from an ordinal number FN of the frame in which the time slots TS1, TS2 are located whose information (blocks B1 and B2) shall be encrypted. Two encrypted information blocks BK1 and BK2 are obtained and these blocks are then formatted by inserting a sync. and training sequence in a known manner (marked with X in FIG. 2). As before mentioned, the drawback with this encryption method is that the same encryption sequence is used two times for two separate time slots which means that non-encrypted information can be recovered from each of the two time slots by an EXOR operation between the encrypted information.

In accordance with the present invention, the time slot ordinal number or an equivalent to this number is inserted into the frame as a further parameter when encrypting. As a result, when transmitting in two time slots within the same frame, the transmitted information will be independently encrypted and encryption security therewith further enhanced in comparison to the case when only the frame number (in addition to the encryption key) is used. If, as is normal, a user uses only one time slot per frame, no time-slot dependent encryption is required because the user's authorization key is unique for a certain time slot. By modifying the input parameters (code key Kc, frame number FN) in direct dependence on the ordinal number of a time slot in a frame in accordance with the present invention, it is possible to apply the original algorithms without needing to make any substantial change to the signalling protocol, as before described, or to the radio equipment.

Figure 3:
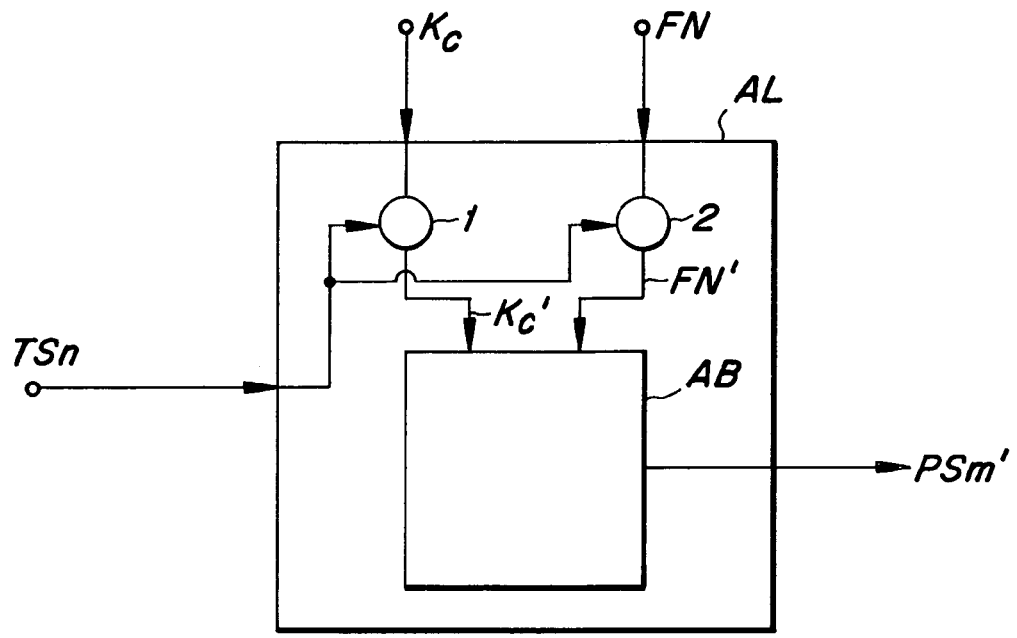
FIG. 3 is a block diagram which symbolizes the algorithms used in two of the inventive methods.

FIG. 3 is a block diagram illustrating the use of the original algorithm A5 with modified input magnitudes in accordance with the present invention.

The block AB in FIG. 3 symbolizes the original algorithm A5, which is specified in accordance with GSM 03.20. The encryption key Kc is now modified in accordance with the ordinal number TSn=TS1 of the relevant time slot, namely the time slot in the frame during which a first block B1 according to FIG. 2 shall be transmitted (possibly interfoliated with an adjacent block, although the principle is the same). In this regard, circle 1 symbolizes a calculation algorithm ALG1 for obtaining a modified value Kc1 of the encryption key. The same algorithm can be used for all time slots in the frame, such that $ALG1(Kc, TSn)=Kcn'$.

It is not necessary to modify all encryption keys and one key may be identical to the normal encryption key Kc for a given time slot.

Similarly, the frame ordinal number FN is modified in dependence on the ordinal number TSn=TS1 of the relevant time slot in the frame within which the first block B1 in FIG. 2 shall be transmitted. Circle 2 therewith symbolizes a calculation algorithm ALG2 for obtaining the modified value FN' of the frame ordinal number. The same algorithm can be used for all time slots in the frame, such that $ALG2(FN, TSn)=FNn'$.

The two algorithms ALG1 and ALG2 need not be equal.

Furthermore, one of the modified frame numbers FNn' may be identical to the normal FN.

Figure 7:
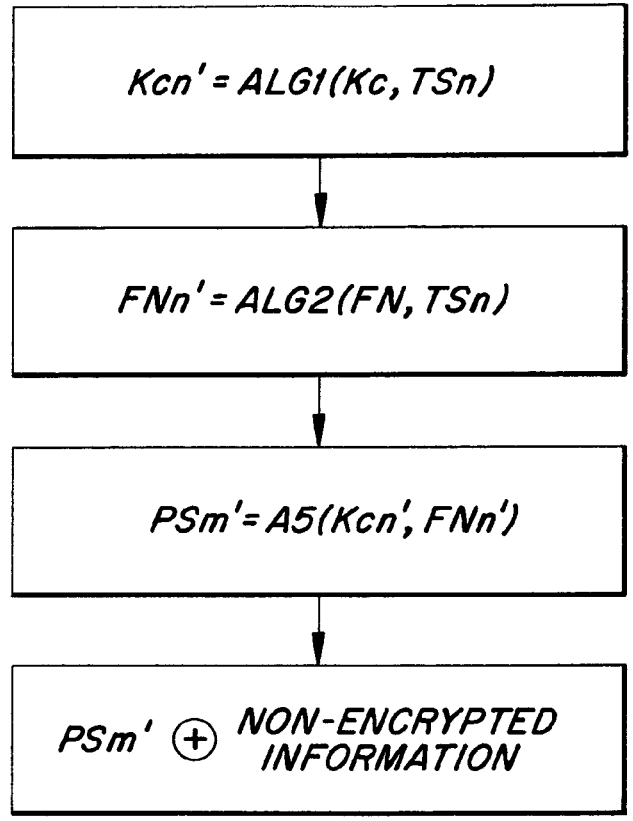

In both of the aforesaid cases, there is obtained an output magnitude in the form of a modified pseudo-random sequence PSm' (all steps of FIG. 7) which is used in the same way as that shown in FIG. 2.

Figure 5:
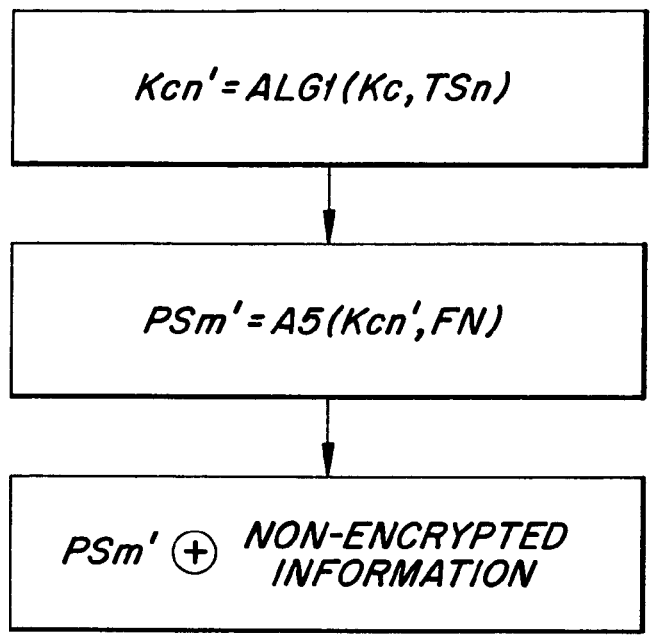
FIGS. 5–8 illustrate the method steps of the various exemplary embodiments of the present invention
Figure 6:
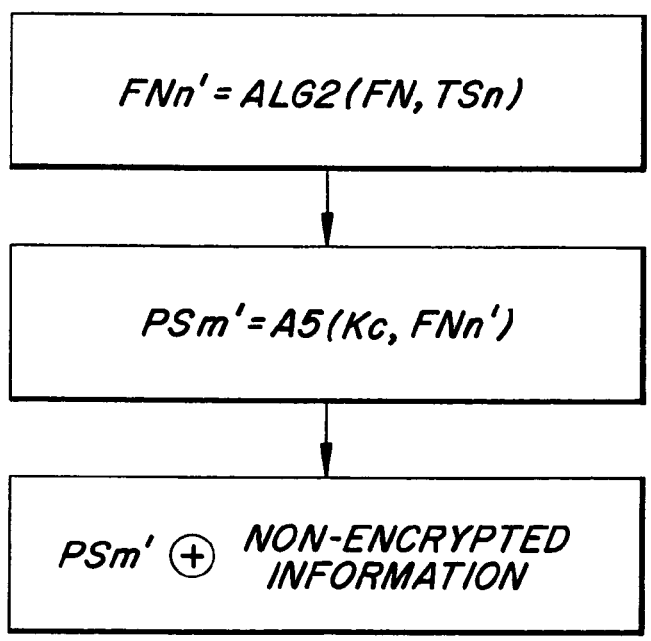

It will be understood that the sequence PSm' can also be generated either
a) by solely using a modified value Kc' on the encryption key and an unchanged value FN on the frame number, i.e. the algorithm 2 is not used; (see steps of FIG. 5) or
b) by solely using a modified value FN' on the frame number FN and an unchanged value on the encryption key Kc, i.e. the algorithm 1 is not (see steps of FIG. 6) used.

Figure 4:
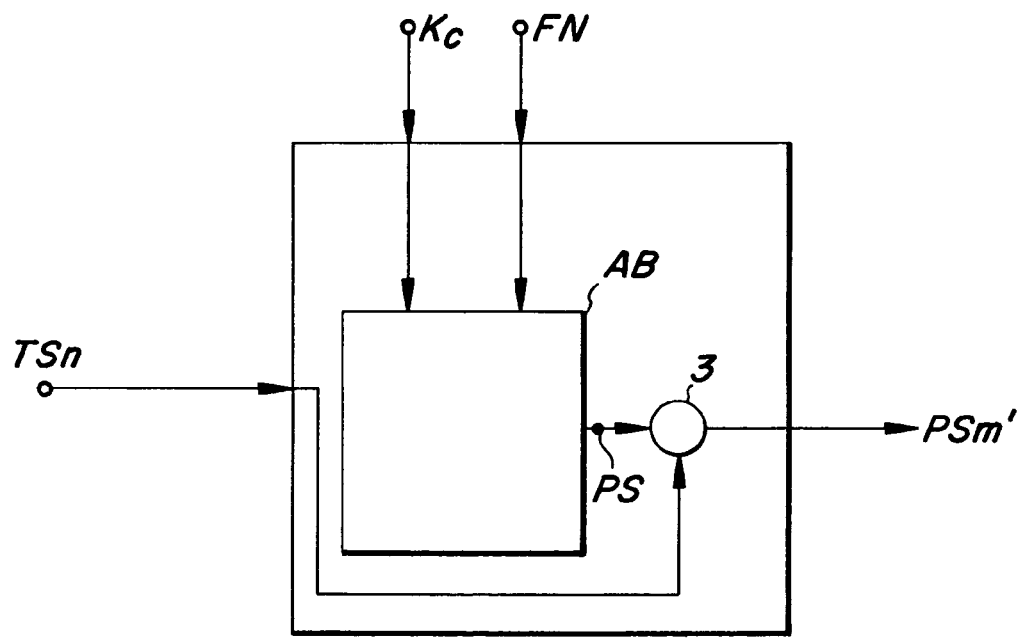
FIG. 4 is a block diagram symbolizing the algorithms used in a third inventive method.
Figure 8:
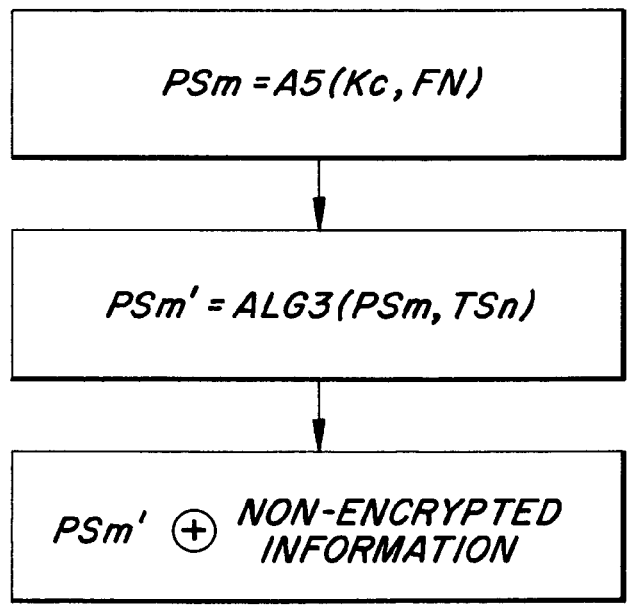

FIG. 4 is a block diagram similar to the block diagram of FIG. 3, but now with totally unchanged input values Kc, FN to the algorithm A5. Instead, the time slot ordinal number TSn (or a value equivalent to said ordinal number) is used as a control value for an algorithm ALG3 symbolized by circle 3 for modifying the normal pseudo-random sequence PS obtained from Kc and FN (see steps of FIG. 8). This algorithm ALG3 may consist in a certain permutation, shift, reordering of values; etc., in the pseudo-random sequence PS, so as to obtain a new sequence PSm'. The sequence may optionally be divided into blocks of 114 bits prior to reformulation, and the values in one or more blocks can be mixed to obtain the new values with an unchanged number of bits (114) in each block.

It is also possible to combine the algorithms ALG1, 2 in FIG. 3 with the algorithm ALG3 according to FIG. 4.

The aforedescribed embodiments of the proposed method relate to transmission cases. It will be understood that in the case of reception wherein incoming information shall be decrypted, the values of Kc and FN and the sequence PS will be modified to Kc', FN' and PSm' respectively in accordance with the agreed algorithms ALG1, ALG3 and ALG3 as described above.

What is claimed is:

1. A method of encrypting information transmitted between a fixed network and a mobile station in a time division multiple access (TDMA) mobile radio system, wherein information is divided into at least two blocks and transmitted in at least two time slots in each frame in a frame sequence, said method of encrypting information comprising the steps of:

a) forming a pseudo-random sequence from an encryption key and an ordinal number of the frame in which the information is transmitted in accordance with an encryption algorithm;

b) forming a modified pseudo-random sequence from said pseudo-random sequence, in dependence on the ordinal number of the time slot within which the information block that is encrypted with the modified pseudo-random sequence shall be transmitted, in accordance with a first algorithm; and c) performing an Exclusive OR (EXOR) operation between said modified pseudo-random sequence and each block of non-encrypted information, wherein generation of the modified pseudo-random sequence for each slot is independent of the non-encrypted information so that there is no error propagation when deciphering a slot with a bit error.

* * * * *